April 29, 1924. Re. 15,823

C. W. BREED

RAILROAD CROSSING OR FROG AND METHOD OF MAKING THE SAME

Original Filed May 2, 1921

Inventor
Charles W. Breed
Williams Bradbury
McCaleb & Pierce Attys.

Reissued Apr. 29, 1924.

Re. 15,823

UNITED STATES PATENT OFFICE.

CHARLES W. BREED, OF WESTERN SPRINGS, ILLINOIS.

RAILROAD CROSSING OR FROG AND METHOD OF MAKING THE SAME.

Original No. 1,412,161, dated April 11, 1922, Serial No. 466,103, filed May 2, 1921. Application for reissue filed February 1, 1924. Serial No. 690,096.

*To all whom it may concern:*

Be it known that I, CHARLES W. BREED, a citizen of the United States, and resident of Western Springs, in the county of Cook and State of Illinois, have invented a certain new and useful Improvement in Railroad Crossings or Frogs and Methods of Making the Same, of which the following is a full, clear, concise, and exact description, reference being had to the accompanying drawings, forming a part of this specification.

My invention relates to a railroad crossing or frog and method of making the same. The invention contemplates the provision of a crossing or frog that is cast of manganese steel, or steel having substantially similar characteristics, and which, even under the pounding of very heavy traffic, will not develop material depressions in those portions of the wheel-carrying surfaces of the casting which lie adjacent to the intersections of the flangeways therein.

Cast manganese steel possesses a number of characteristics which render it particularly desirable for use in railroad crossings, frogs, and the like, but heretofore the use of these castings in structures of the class mentioned, has been subject to a very serious objection, viz, the pounding incidental to heavy traffic has invariably caused depressions to occur in the wheel carrying surfaces of such castings at points adjacent the intersections of the flangeways which are formed therein. It is my theory that during the course of the usual heat treatment which follows the removal of the castings from the molds in which they are formed, the grains or molecules composing the steel become separated to a very considerable extent and that when such a casting is put into service, in a railroad crossing or the like, the hammering effect of the wheels running across the flangeways pounds the steel until the grains or molecules composing the same are very closely compacted. At any rate it has been found that after a manganese steel casting has served any considerable time in a railroad crossing or the like, depressions occur in the wheel carrying surfaces of the casting at points adjacent the flangeway intersections. I have discovered that after the wheel carrying surfaces have been depressed to a definite extent, varying somewhat with the quality of the steel, the depth of the depressions does not increase, and in subsequent use of the crossing, those portions of the wheel carrying surfaces adjacent the flangeway intersections withstand the shock and wearing action of the wheels as well as do those portions of the wheel carrying surfaces which are more remote from the flangeway intersections. I believe that this phenomenon may be attributed to the fact that after the metal has been depressed to a certain extent by the pounding of the wheels, the grains or molecules composing the steel become compacted to the maximum extent. There is a limit to which the said grains or molecules may be compacted. After that limit is obtained, further pounding of the wheels has practically no effect in so far as the deepening of the depressions in the wheel carrying surfaces of the casting is concerned.

Depressions formed in the wheel carrying surfaces of a crossing or frog casting, as explained above, are very injurious to rolling stock, and to a very large extent, are responsible for the shocks sustained by passengers when a coach passes over the ordinary form of railroad crossing or frog.

So far as I am aware, no one prior to me has devised a method of constructing a crossing or frog casting which will not develop depressions under the pounding action of wheels passing over the flangeways in the casting.

In order to attain the objects of my invention, I provide those wheel carrying portions of the casting which lie adjacent the flangeways with "pads" or "high surfaces," the height of same varying with the limit to which the particular grade of steel, of which the casting is formed, may be compacted. These "pads" or "high surfaces" are then pounded or have pressure otherwise applied thereto until the metal constituting the pads has been compacted to the limit hereinbefore mentioned. The compacting is preferably carried out while the casting is at normal temperatures; that is, without heating except such as is produced by the compacting process. The initial height of the "pads" or "high surfaces" is such that when compacted to the maximum extent, the upper surfaces of the pads lie flush with the other wheel carrying portions of the casting. I have found that a crossing or frog casting constructed in this fashion does not become depressed at those portions of its wheel carrying surfaces which lie adjacent the intersections of the casting flangeways. The useful life of the casting is thus prolonged and the shocks to rolling stock at the crossing or frog are minimized.

My invention perhaps will be best understood when a detailed description thereof is read in connection with the accompanying drawing, in which—

Figure 1:
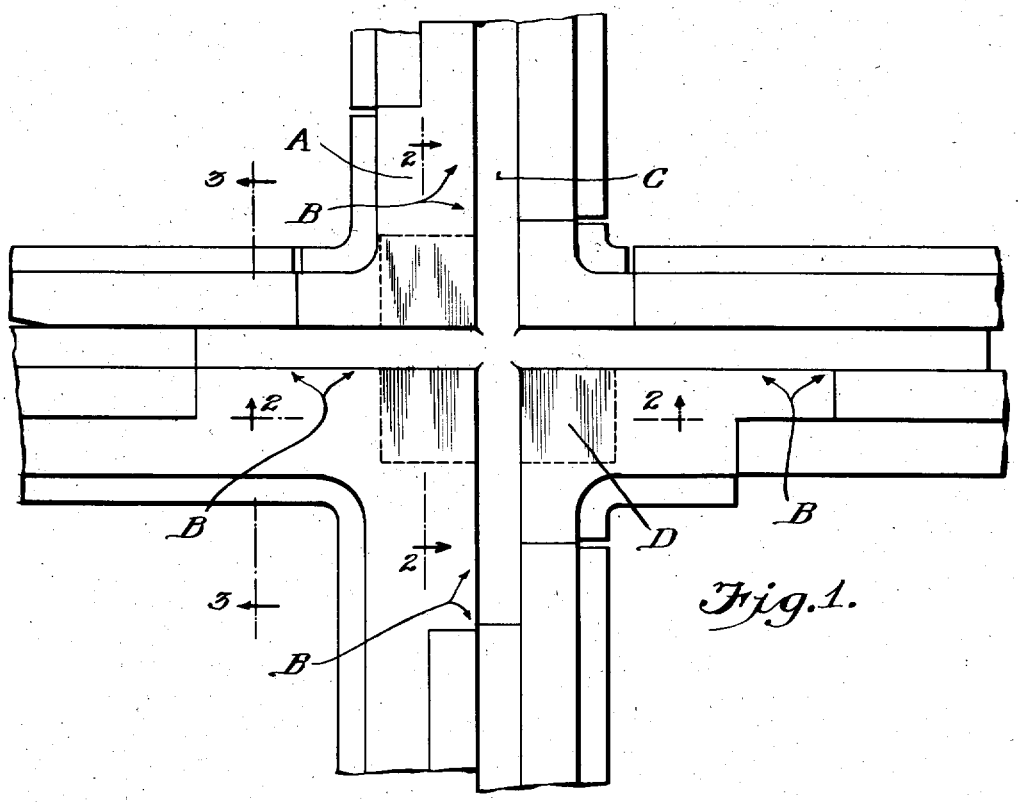
Figure 1 is a fragmentary top plan view of a railroad crossing, the casting shown in this figure being shaded to indicate those portions of the wheel carrying surfaces thereof which are subjected to the greatest shocks in service.

In the drawing, reference letter A indicates a portion of a crossing casting of manganese steel. The wheel carrying surfaces of the casting are indicated at B—B and the intersecting flangeways are indicated at C—C. Except for the pads presently to be described, and the manner in which the same are treated, the particular casting here shown need not differ essentially in its construction from crossing castings now in general use; hence any one skilled in the art to which my invention relates will understand how the crossing casting here shown is attached to and co-operates with the rails of the tracks with which it is associated.

Figure 2:
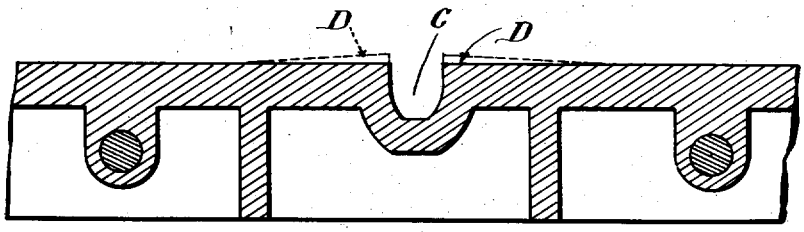
Figure 2 is a section which may be regarded as having been taken on either of the lines 2—2 of Figure 1, this view illustrating, by dotted lines, the "pads" or "high surfaces" which are formed on the wheel carrying surfaces of the casting.
Figure 3:
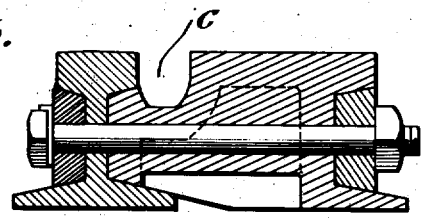
Figure 3 is a section taken on the line 3—3 of Figure 1.

Those portions of the wheel carrying surfaces which must withstand the greatest shocks in service are indicated by the shading designated D—D in Figure 1. The casting of my invention is provided with "raised surfaces" or "pads" which lie within the shaded areas D—D. These pads are integral with the casting and the upper surfaces thereof are preferably inclined in the directions of travel. The pads are highest at the margins of the flangeways and taper down to the level of the other wheel carrying surfaces of the casting. The initial height of the pads is clearly indicated by the dotted lines in Figure 2.

The final step in the method of my invention is to hammer or otherwise apply pressure to the upper surfaces of the pads, preferably while the casting is at normal temperature, until the said upper surfaces lie in the same plane with the other wheel carrying surfaces of the casting. The maximum height of the pads is initially such that when the pads have been forced down flush with the other wheel carrying surfaces of the casting, the metal of those portions of the wheel carrying surfaces which lie next adjacent the flangeway intersections will have been compacted to the greatest possible extent. This being accomplished, it will be understood that depressions in the wheel carrying surfaces of the casting, due to wheels pounding upon the portions thereof next adjacent the flangeways, will not be produced.

While, for the purposes of illustration, I have elected to describe my invention as it is applied to the manufacture of a railroad crossing casting, it will be understood that my invention is not so limited but is equally applicable to the construction of other similar devices such as frogs and the like.

Having thus described my invention, what I claim is new and desire to secure by Letters Patent of the United States, is:—

1. The method of making a railroad crossing or the like which consists in forming a casting provided with intersecting flangeways and with raised pads at those portions of its wheel carrying surfaces which lie adjacent the flangeway intersections and applying pressure to the upper surfaces of said pads while at normal temperatures and thereby causing the same to be forced down with the other portions of the wheel carrying surfaces of the casting.

2. The method of making a railroad crossing or the like which consists in forming a casting provided with intersecting flangeways and with raised pads at those portions of its wheel carrying surfaces which lie adjacent the flangeway intersections, and then compacting those wheel carrying portions of the casting which lie adjacent the flangeway intersections by applying pressure to the upper surfaces of the pads while at normal temperatures to force said pad surfaces into the same horizontal plane as the other wheel carrying surfaces of the casting.

3. The method of making a railroad crossing or the like which consists in forming a casting provided with intersecting flangeways, wheel carrying surfaces, and raised pads on those portions of the wheel carrying surfaces which are most violently engaged by car wheels crossing the flangeways and applying pressure to the upper surfaces of the pads while at normal temperatures to force said pad surfaces into the same plane with the other wheel engaging surfaces of the casting.

4. The method of making a railroad crossing or the like which consists in forming a casting provided with intersecting flangeways, wheel carrying surfaces, and raised pads on those portions of the wheel carrying surfaces which lie adjacent to the flangeways, said pads tapering from the flangeways and applying pressure to the upper surfaces of the pads to force said upper surfaces into the same plane with the other wheel carrying surfaces.

5. A railroad crossing or the like comprising a casting provided with intersecting flangeways and wheel carrying surfaces, those portions of said casting adjacent to said flangeway intersections increasing in density toward the points of greatest wear.

6. A railroad crossing or the like comprising a casting provided with intersecting flangeways and wheel carrying surfaces, all portions of which lie in the same horizontal plane, those portions of said casting adjacent to said flangeway intersections comprising compacted metal of greater density than the the remaing portions of said casting.

7. A railroad crossing or the like comprising a casting having a wheel carrying surface, all portions of which lie in the same plane, a flangeway crossing said surface, a portion of said casting adjacent said flangeway comprising compacted metal of greater density than the uncompacted portions of said casting.

8. A railroad crossing or the like comprising a casting of manganese steel having a wheel carrying surface, all portions of which lie in the same plane, a flangeway crossing said surface, a portion of said casting adjacent said flangeway comprising compacted metal of greater density than the uncompacted portions of said casting.

9. A railroad crossing or the like comprising a casting of manganese steel provided with intersecting flangeways, and wheel carrying surfaces, those portions of said casting adjacent to said flangeway intersections increasing in density toward the points of greatest wear.

10. In a railroad crossing track members arranged to provide wheel tread surfaces and intersecting flange receiving recesses, the tread surfaces having raised portions adjacent to the intersection for providing metal to be compacted prior to installation toward the level of the remainder of the tread surfaces.

11. In a railroad crossing, cast steel crossing forming members providing wheel tread surfaces, and intersecting flange receiving recesses, the tread surfaces of said members having raised portions adjacent to the intersection and tapering therefrom for providing metal to be compacted prior to installation toward the level of the remainder of the tread surfaces.

12. In a railroad crossing, the combination with the angularly disposed track members having wheel tread surfaces, of a crossing structure providing intersecting flange receiving recesses and tread surfaces adjacent to the intersection, the tread surfaces of said crossing structure adjacent to the intersection being raised above the tread surfaces of said track members for providing metal to be compacted toward the level of the tread surfaces of the track members.

In witness whereof, I have hereunto subscribed my name this 15 day of January, 1924.

CHARLES W. BREED.

In presence of:
FRANK LELIS,
A. L. BREITENSTEIN.